United States Patent [19]

Park

[11] Patent Number: 4,959,843
[45] Date of Patent: Sep. 25, 1990

[54] CONTENT INDUCED TRANSACTION OVERLAP (CITO) BLOCK TRANSMITTER

[75] Inventor: You K. Park, Vienna, Va.

[73] Assignee: Allied-Signal Inc., Morris Township, Morris County, N.J.

[21] Appl. No.: 348,435

[22] Filed: May 8, 1989

[51] Int. Cl.[5] .............................. H04L 27/04
[52] U.S. Cl. ................... 375/59; 375/122; 382/56; 370/118
[58] Field of Search .................. 375/27, 122, 59; 301/29, 30, 31, 32; 358/263, 133, 136; 382/56; 370/118; 455/72

[56] References Cited

U.S. PATENT DOCUMENTS

| | | | |
|---|---|---|---|
| 4,493,074 | 1/1985 | Walter et al. ................. | 370/119 |
| 4,598,411 | 7/1986 | Berkovich et al. ............. | 375/122 |
| 4,633,483 | 12/1986 | Takahashi et al. ............. | 375/122 |
| 4,706,264 | 11/1987 | Cung ......................... | 358/263 |

Primary Examiner—Douglas W. Olms
Assistant Examiner—Stephen Chin
Attorney, Agent, or Firm—Donald B. Paschburg; Howard G. Massung

[57] ABSTRACT

A CITO communication block transmitter which provides for increased data compression by sorting the entire global data of senders which share a CITO communication channel is disclosed. With this technique, a sender transmits a full block of its data in a single data bucket instead of having to utilize many separate data buckets. The CITO block transmitter comprises a next-data register, a next-bit position register, a data-ready register a FIFO buffer and a block transmitter in addition to the basic CITO registers.

17 Claims, 4 Drawing Sheets

CONTENT INDUCED TRANSACTION OVERLAP (CITO) BLOCK TRANSMITTER

BACKGROUND OF THE INVENTION

Field of the Invention

The present invention is related to the field of computer communications and more particularly to a Content Induced Transaction Overlap (CITO) driver which transmits a block of data.

Description of the Prior Art

Various types of multiple-access channel communication systems are known in the art. These communication systems may conveniently be divided into two distinct types, the Time Division Multiple Access (TDMA) systems, and the Carrier Sensed Multiple Access (CSMA) systems. In Time Division Multiple Access systems as disclosed by Hopkins et al in U.S. Pat. No. 4,161,786; Lowe, Jr. In U.S. Pat. No. 4,199,662 or White et al in U.S. Pat. No. 4,199,661 the transmission channel capacity is divided into time slots during which identified transmitters are allowed to transmit their information over the communication network. Each transmitter is assigned a specific time slot so that each transmitter in turn will have an opportunity to transmit its information. In Carrier Sensed Multiple Access systems, such as disclosed by Eswaran et al in U.S. Pat. No. 4,292,623, Herzog, U.S. Pat. No. 4,199,663, or Spracklen et al in U.S. Pat No. 4,337,465, each transmitter detects when the communication channel is idle, then after a predetermined period of time, attempts to transmit its information. Typically, the waiting period depends on the assigned priority of the transmitter.

The problem with the Time Division Multiple Access system is that often a particular transmitter may not have any information to transmit during its allotted time slot, while other transmitters may generate two or more messages in the period between their allotted time slots. Therefore some transmission time slots are wasted while other messages are delayed while awaiting access to the common transmission line. This problem is partially overcome by the Carrier Sensed Multiple Access system under light or moderate loads. However under high message traffic conditions, the probability of simultaneous access to the common transmission line rises sharply, and excessive amounts of time are wasted resolving priority differences of the involved transmitters. A Content Induced Transaction Overlap Communication System (CITO) as disclosed by Walter et al in U.S. Pat. No. 4,493,074, and assigned to the same assignee as the present invention, is hereby incorporated by reference and is designed to overcome these problems. The present invention is an improvement of the CITO communication channel because the present invention allows the transmission of a block of data of a processor within a bucket in lexicographical order.

A CITO communication system is designed for transmitting data from a plurality of senders to a receiver over a single communication channel. Each sender has a data register which stores the multiple bit data word to be transmitted, a word boundary register which stores the number of bits in the data word and a bit position register. The transmission begins with each sender transmitting the highest order bit stored in the data register. Bits are transmitted on the channel in an overlapped manner such that the channel state is the logical sum or product of the transmitted bits. Using single phase representation, where a zero bit is transmitted as a finite signal level and a one bit is transmitted as a null signal level, the composite channel states are accordingly 0 or 1.

The senders each then compare the state of the communication channel with their transmitted bit to determine if they are the same. If the state of the communication channel is the same as the transmitted bit, the sender transmits its next highest bit and decrements its word boundary and bit position registers. However, if the state of the communication channel is different from its transmitted bit, the sender terminates the transmission of its remaining bits but continues to monitor the communication channel and decrement its word boundary register for each bit transmitted on the communication channel. At the end of the transmission of the data word, indicated by the word boundary register being decremented to zero, each sender enters into bit competition with all of the senders based on the content of its bit position register when it stopped transmitting to determine if it has lexicographically the next smallest data word. If it has, it initiates the sending of its remaining data bits. However, if it doesn't have lexicographically the next smallest data word, the sender waits until the end of the transmission of the current data word and re-enters the bit competition. This cycle repeats until all of the senders have completed the transmission of all the bits in their data words. At this point, all the bit position registers are at zero and no sender performs in the bit competition. The senders recognize the termination of the current data bucket (collection of data bits in the different senders) and the transmission of the next data bucket can begin after sYnchronization.

One of the major advantages of CITO over other communication methods is that it provides for the sorting of data as a by-product of the communication protocol. CITO, however, only provides for the sorting of data in the currently transmitted data bucket. The prior art CITO driver allows each Sender to transmit, at most, a single data item in the data bucket. This restriction severely limits the usefulness of the sorting capability of CITO because each Sender may have many data items. Another advantage of CITO is its data compression capability, however, a transmission method of at most, one data item per data bucket, also reduces the data compression capability. If a Sender has n data items to transmit and no other Senders want to transmit, then the Sender must transmit each data item one by one as a separate independent data bucket. Thus, there is no data compression.

The known solution for providing CITO data compression for a block of data within a single Sender is to incorporate a content addressable memory (CAM) into a CITO driver. If a Sender writes a block of its data into the CAM, the CITO driver can transmit the entire data of the CAM within the same bucket because CAM provides various associative functions such as the calculation of the next minimum value. However, CAM has a high pin/circuit ratio and a high power dissipation. Thus, it is not only expensive, but the fabrication of a large size CAM may not be feasible because of the status of current technology. Also, CITO needs only the one operation, calculation of the next minimum value, not the many associative operations of CAM, therefore, the implementation of CAM for CITO wastes most of CAM's capability.

A variety of other techniques exist for the transmission of data with data reduction. One such technique is a Data Exchange Processor For Distributed Computing System invented by Kober and disclosed in U.S. Pat. No. 4,181,936. This patent describes a distributed computing system which has a data exchange processor that is especially adapted to control operations involving the transfer of data among components of the distributed computing system. This system differs from the present invention because the distributed computing system does not provide for the transmission of distributed messages in lexicographical order. U.S. Pat. No. 4,698,628 by Herkert et al, discloses A Method And Apparatus For Transmission Of Data With Data Reduction. In this patent the data which is transmitted between the several network levels is reduced by deleting data which corresponds to a predetermined information content. This disclosure differs from the present invention because this disclosure does not provide for the transmission of distributed messages in lexicographical order. U.S. Pat. No. 4,598,411 issued to Berkovich et al and assigned to the same assignee as the present invention is hereby incorporated by reference and discloses an On-The-Fly Data Compression System. This system compresses the data transmitted between the data source and ultimate utilization device. The data compression modules compress the data using a word representation by associative processing buffer and a content induced transaction overlap (CITO) transmission protocol which results in an interleaved transmission of data bits and bit position bits, the latter being indicative of the number of data bits that will be transmitted during the subsequent data transmission. This disclosure, however, differs from the present invention because it does not provide for the transmission of a block of data of a Sender within a data bucket in lexicographical order.

SUMMARY OF THE INVENTION

This invention represents a CITO communication block transmitter which provides for increased data compression by sorting the entire global data of Senders which share a CITO communication channel. This technique is performed by allowing a Sender to transmit a full block of its data in a single data bucket instead of having to utilize many separate data buckets. For the block transmission of data, a CITO device needs a next-data register (NDR), a next-bit position register (NBPR), a data-ready register (DRR) a FIFO buffer and a block transmitter in addition to the basic CITO registers which are a data register (DR), a bit position register (BPR), and a word boundary register (WBR).

DETAILED DESCRIPTION OF THE INVENTION

Figure 1:
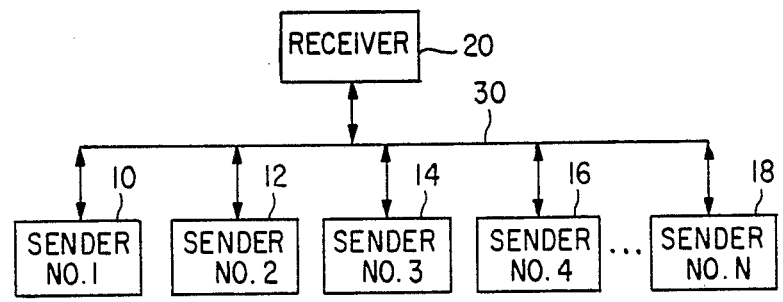
FIG. 1 is a block diagram of a multiple access communications system.

The content induced transaction overlap communication system is intended to solve many of the problems that exist when many transmitters require multiple access to a single communication channel to a common receiver. FIG. 1 is a block diagram of a typical system having multiple Senders 10, 12, 14, 16 and 18 transmitting information to a Receiver 20 over a common communication channel or Bus 30. Each Sender 10, 12, 14, 16 and 18 is capable of randomly sending information which is required by the Receiver 20. The Senders 10, 12, 14, 16 and 18 may represent individual sensors, controls, or other types of inputs, or may be individual microprocessors in a multiple computer system or individual computers in a fault tolerant computer network or any combination of the above. The Receiver may be a utilization device, or master in a multiple computer system, or any other similar device.

Figure 2:
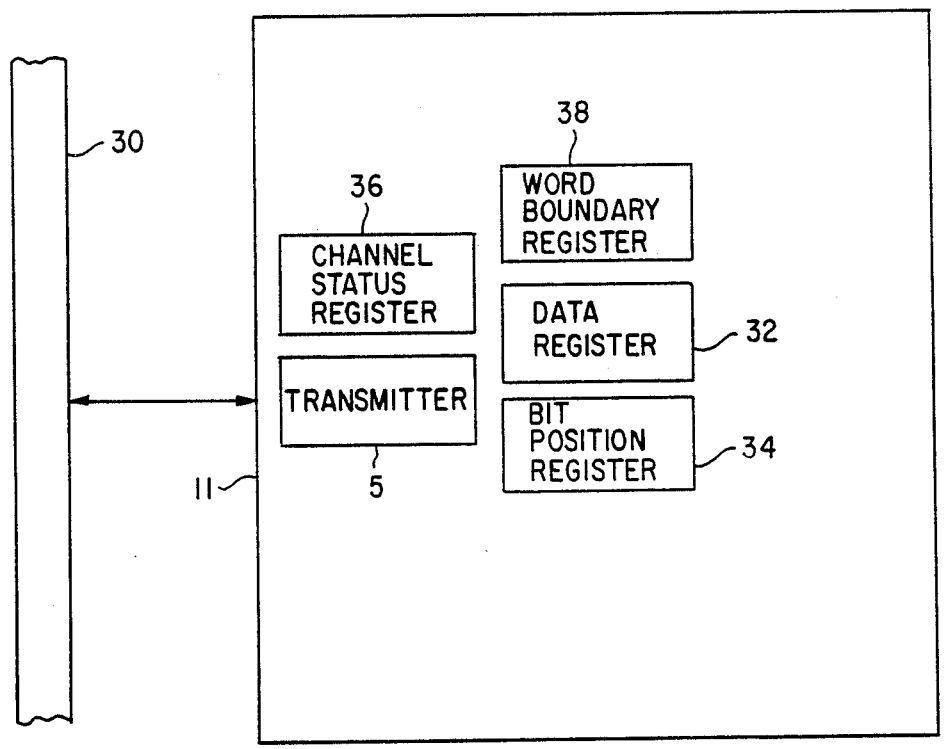
FIG. 2 is a block diagram illustrating the interface elements of a prior art Sender in a content induced transaction overlap (CITO) communication system.

From the prior art, as shown in FIG. 2, the interface portion 11 of each Sender 10, 12, 14, 16 and 18 embodies a data register (DR) 32, a bit position register (BPR) 34, a channel status register (CSR) (receiver) 36, a word boundary register (WBR) 38 and a transmitter 5. The data register 32 holds the data word to be transmitted to the CITO communication channel 30. The data word is shifted out of the data register 32 to the CITO communication channel 30 one bit at a time in serial fashion. The bit position register 34 is loaded with the number of bits (r) in the data word to be sent after the Sender has synchronized with the channel. It is decremented every time the Sender successfully transmits a data bit. It is also used to determine access privilege to the communication channel. The channel status register 36 is a one bit register which stores the bit value of the last transmission on the communication channel and functions as the receiver portion of the Sender. The word boundary register 38 keeps track of the number of bits that have been sent over the communication channel and is used to determine when a word has been completely transmitted. Until the word is completely transmitted, the word boundary register 38 signals the Sender to attempt to continue its data transmission.

Figure 3:
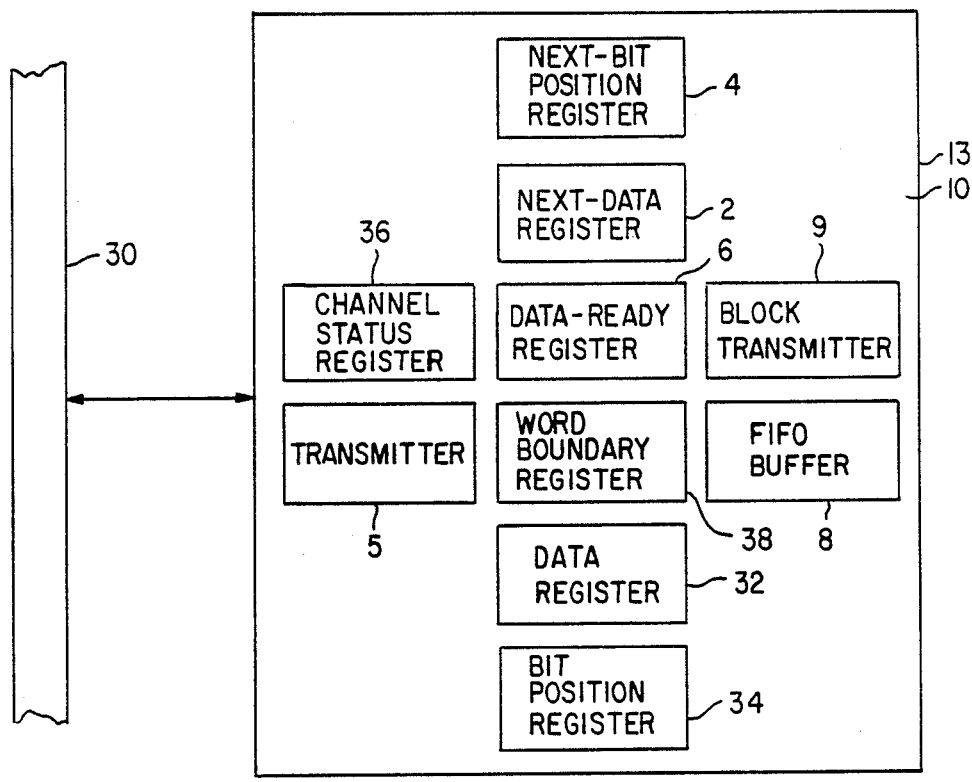
FIG. 3 is a block diagram illustrating the interface elements of a Sender having a CITO block transmitter.

As illustrated in FIG. 3, the interface portion 13 of each Sender 10, 12, 14, 16 and 18 has a CITO block transmitter, a next-data register (NDR) 2, a next-bit position register (NBPR) 4, a data-ready register (DRR) 6, and a FIFO buffer 8 in addition to the basic CITO registers which are the data register (DR) 32, the bit position register (BPR) 34, the word boundary register (WBR) 38, and the channel status register 36.

To drive the data to and from the various registers and the CITO communication channel 30, there are two functional units, a transmitter 5 and a block transmitter 9. While the transmitter 5 transmits the data from data register 32, onto the CITO communication channel 30, the block transmitter 9 loads the next-data register 2 from the FIFO buffer 8, calculates the next-bit position and sets the next-bit position register 4 to the value. The next-bit position is the location of the first bit of the next-data register (NDR) whose value is not equal to that of the data register 32. After completion of the transmission of the data register 32, the transmitter 5 loads the data register 32 and the bit position register 34 from the next-data register 2 and the next-bit position register 4.

The FIFO buffer 8 is required to provide a continuous supply of data to the block transmitter 9. Without the FIFO buffer, the Sender would have to provide the next data item immediately after each transmission of the data item. This would severely reduce the performance of the Sender. With the FIFO buffer, the Sender may write a block of data into the FIFO buffer, as long as the FIFO buffer is not full, without waiting for the completion of data transmission. Thus the Sender is interrupted less frequently.

Figure 4:
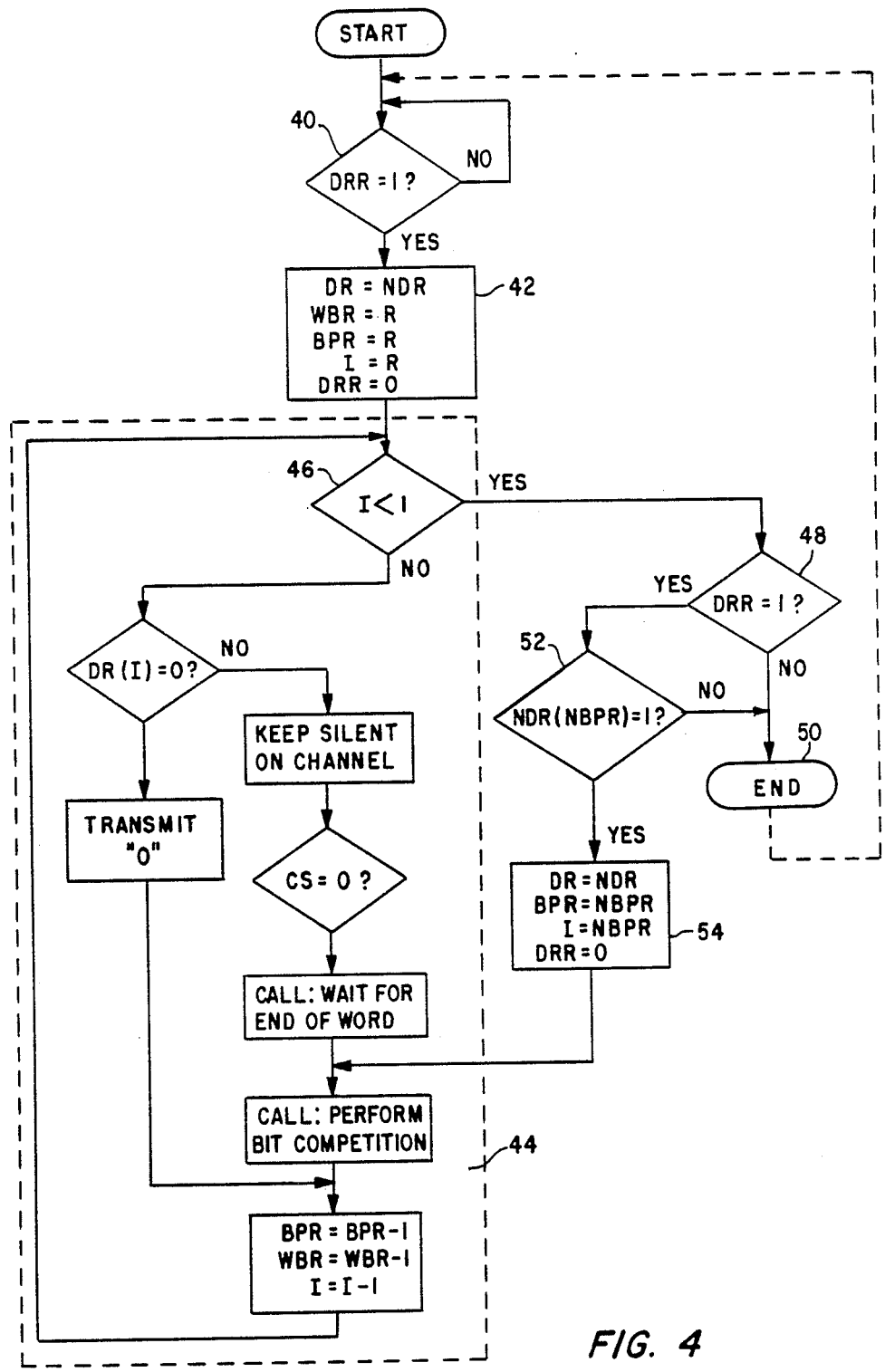
FIG. 4 is a flow diagram of the transmitter of the CITO block communication system.

The detailed functional description of the transmitter 5 is as follows. Referring to FIG. 4, the transmitter begins with testing the data-ready register (DRR) as indicated by block 40. If it is ready, the transmitter loads the data register (DR) from the next-data register (NDR) and initializes registers as indicated by block 42. Block 44, illustrates the typical prior art transmission of data using the prior art CITO communication method. After completion of a typical transmission as indicated by the condition "yes" of block 46, the transmitter tests the data-ready register (DRR) as indicated by block 48. If it is not ready, the transmitter completes the transmission of a bucket of data as indicated by block 50. If it is ready, the transmitter examines the value of the next-data register (NDR) at the position of the next-bit position register (NBPR) as indicated by block 52. This test is required to provide the internal CITO data compression of arbitrary data and to prevent the possible error caused by out-of-order data supplied by the Sender. If it is "1", the value of the next data is larger than that of the current data. Thus the transmitter can immediately participate in the next bit competition and the next data can be transmitted within the current data bucket as indicated by block 54. If the value of the next-data register at the next-bit position is "0", the value of the next data is smaller than that of the current data; thus transmission has to be suspended until the end of the current data bucket and the next data may be transmitted at the beginning of the next bucket as indicated by block 50.

A CITO transmission consists of two types of messages, bit position and data. The length of the data varies from a full length (r), for the first data item in the bucket, to zero, for the message suspended at the last position. However, the length of the bit position message is always a constant log(r). Thus there will be at least log(r) time slots available for the Sender to prepare the next data transmission and therefore provide for the continuous transmission of a block of data.

Figure 5:
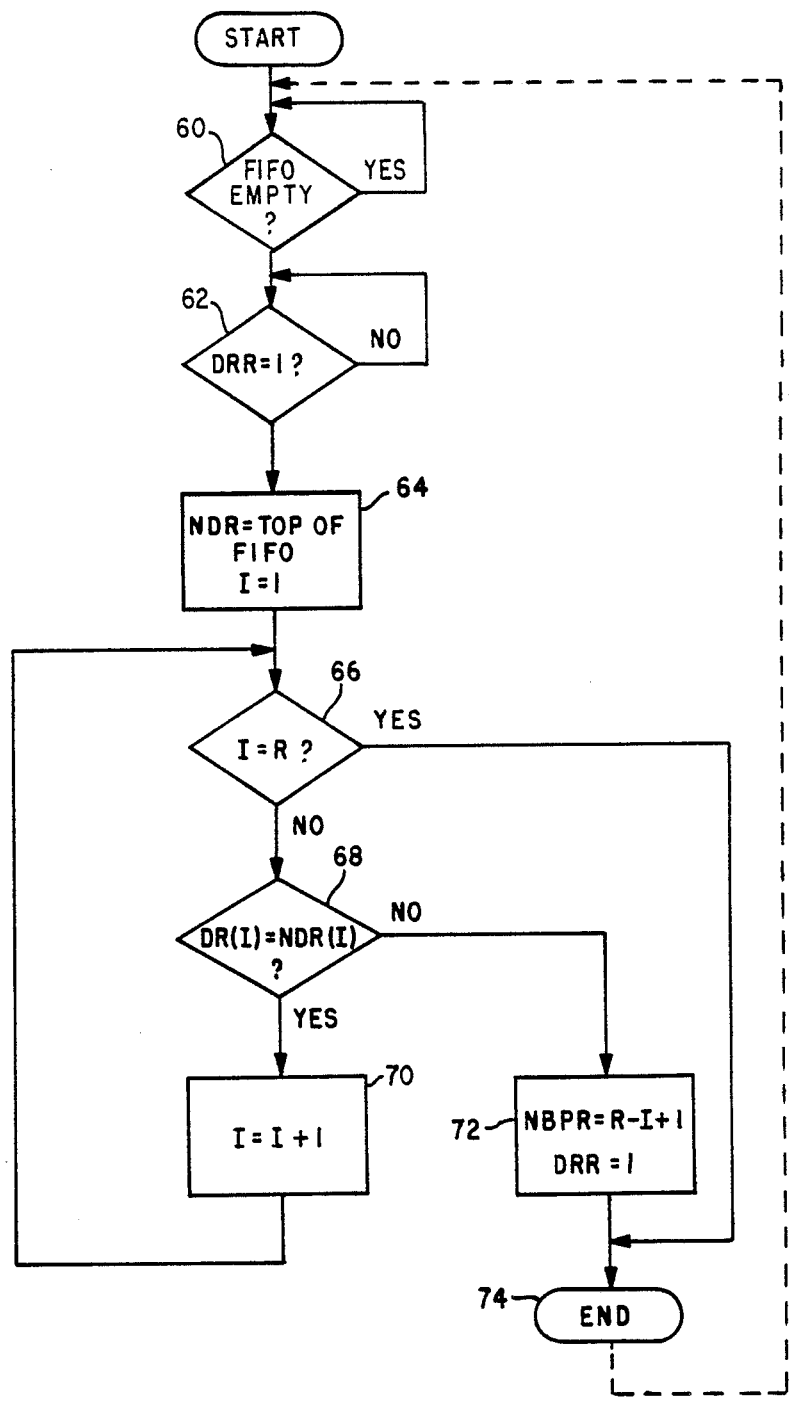
FIG. 5 is a flow diagram of the block transmitter of the CITO block communication system.

While the transmitter 5 transmits the data from the data register (DR) 32, the block transmitter 9 prepares the next data from the FIFO buffer. As illustrated in FIG. 5, the block transmitter 9 begins with testing the status of the FIFO buffer as indicated by block 60. If it is empty, the block transmitter continues to test the status. If it is not empty, the block transmitter tests the data-ready register (DRR) until it becomes "1" as indicated by block 62. If it is "1", the block transmitter loads the next-data register from the top of the FIFO buffer and sets the index i to 1 as indicated by block 64. The block transmitter tests the index i and if it is "r" the block transmitter terminates as indicated by block 66. If it is not "r", the block transmitter tests whether the value of the data register (DR) being transmitted at the bit position i is equal to that of the next-data register (NDR) as indicated by block 68. If they are equal, the block transmitter increases the index i by 1 and repeats the above tests as indicated by block 70. If they are not equal, the block transmitter sets the next-bit position register (NBPR) and data-ready register (DRR) to (r−i+1) and 1, respectively, as indicated by block 72. After setting the registers, the block transmitter completes the processing of one data item and repeats all of the above processes as indicated by block 74.

It is not intended that this invention be limited to the hardware or software arrangement, or operational procedures shown disclosed. This invention includes all of the alterations and variations thereto as encompassed within the scope of the claims as follows.

I claim:

1. A block transmitter of data comprising:
   a plurality of register means for storing and positioning data for transmission;
   FIFO buffer means for storing and providing a continuous supply of data from a data source to said plurality of register means;
   block transmitter means for loading said plurality of register means from said FIFO buffer means; and,
   means for transmitting said data from said plurality of register means onto a communication channel so that a full block of data is transmitted in a single data bucket using a block transmission method;
   said plurality of register means comprises:
   data register means for storing a multi-bit data work; each data bit of said multi-bit data word having one of two possible states;
   word boundry register means for storing a number corresponding to the number of data bits in said multi-bit data word;
   bit position register means for storing a number corresponding to the number of bits in said multi-bit data word;
   channel status register means for functioning as a receiver portion of a plurality of senders and for storing a bit value of last transmission;
   next-data register means for storing a next multi-bit data word after said next multi-bit data word is received from said FIFO buffer means, said next multi-bit data word is eventually loaded into said data register means after completion of transmission of said data register means;
   next-bit position register means for storing a number corresponding to the number of bits in said next multi-bit data word, and,
   data-ready register means for monitoring whether said data register means is ready to be loaded from said next-data register means.

2. A block transmitter of data as defined in claim 1 wherein said block transmitter means comprises:
   means for loading said next-data register means from said FIFO buffer means;
   means for calculating a next-bit position; and,
   means for setting said next-bit position register means.

3. A block transmitter of data as defined in claim 2 wherein said block transmitter means further comprises:
   means for testing said FIFO buffer means to determine whether said FIFO buffer means is empty; and,
   means for testing said data-ready register means until a logical state of one is obtained.

4. A block transmitter of data as defined in claim 3 wherein said block transmitter means further comprises:
   means for testing whether the value of said data register means being transmitted is equal to the value of said next-data register means.

5. A block transmitter of data as defined in claim 1 wherein said means for transmitting comprises:
  means for transfering said data bits from said data register means onto said communication channel one bit at a time in serial fashion; and,
  means for then loading said data register means from said next-data register means and said bit position register means from said next-bit position register means.

6. A block transmitter of data as defined in claim 5 wherein said means for transmitting further comprises:
  means for decrementing said word boundary register means and said bit position register means to signify the state of the transmitted data bit was the same as the state of said communication channel; and,
  means for testing said data-ready register means a first time to determine whether said means for transmitting should load said data register means from said next-data register means.

7. A block transmitter of data as defined in claim 6 wherein said means for transmitting further comprises:
  means for initializing said word boundary register means and said bit position register means.

8. A block transmitter of data as defined in claim 7 wherein said means for transmitting further comprises:
  means for testing said data-ready register means a second time to determine whether said transmitter means should complete transmission of said data bits; and,
  means for examining said next data register at a next bit position of said next-bit position register to determine whether value of next data is larger than value of current data, therefore determining whether transmission has to be suspended until transmission of a next collection of data words.

9. A block transmitter of data as defined in claim 1 wherein said two possible states are logical states zero and one.

10. A data communication system having a single data communication channel interconnecting a plurality of senders to at least one receiver, wherein each sender comprises:
  data register means for storing a multi-bit data word; each data bit of said multi-bit data word having one of two possible states;
  word boundry register means for storing a number corresponding to the number of data bits in said multi-bit data word;
  bit position register means for storing a number corresponding to the number of bits in said multi-bit data word;
  channel status register means for functioning as a receiver portion of said plurality of senders and for storing a bit value of last transmission on said single data communication channel;
  FIFO buffer means for storing and providing a continuous supply of data bits from a data source for a block transmission of data bits;
  next-data register means for storing a next multi-bit data word after said next multi-bit data word is received from said FIFO buffer means, said next multi-bit data word is eventually loaded into said data register means after completion of transmission of said data register means;
  next-bit position register means for storing a number corresponding to the number of bits in said next multi-bit data word;
  transmitter means for transmitting said data bits from said data register means onto said single data communication channel one bit at a time in serial fashion and for then loading said data register means from said next-data register means and said bit position register means from said next-bit position register means;
  data-ready register means for monitoring whether said data register means is ready to be loaded from said next-data register means by said transmitter means;
  block transmitter means for loading said next-data register means from said FIFO buffer means, for calculating a next-bit position and for setting said next-bit position register; and,
  means responsive to said single data communication channel assuming the same state as the transmitted data bit for enabling said transmitter means to transmit a next collection of data words.

11. A data communication system as defined in claim 10 wherein said transmitter means further comprises:
  means for decrementing said word boundary register means and said bit position register means to signify the state of the transmitted data bit was the same as the state of said single data communication channel; means for testing said data-ready register means a first time to determine whether said transmitter means should load said data register means from said next-data register means;
  means for initializing said word boundary register means and said bit position register means;
  means for testing said data-ready register means a second time to determine whether said transmitter means should complete transmission of said data bits; and,
  means for examining said next data register means at said next bit position of said next-bit position register means to determine whether value of next data is larger than value of current data, therefore determining whether transmission has to be suspended until transmission of a next collection of data words.

12. A data communication system as defined in claim 10 wherein said block transmitter means further comprises:
  means for testing said FIFO buffer means to determine whether said FIFO buffer means is empty;
  means for testing said data-ready register means until a logical state of one is obtained;
  means for loading said next-data register means from said FIFO buffer means and setting an index I to one;
  means for testing said index I to determine whether it is R;
  means for testing whether the value of said data register means being transmitted at bit position I is equal to the value of said next-data register means;
  means for setting said next-bit position register means to $R-I+1$; and,
  means for setting said data-ready register means to 1.

13. A data communication system as defined in claim 10 wherein said sender further comprises:
  means for disabling said transmitter means in response to detecting a difference between the state of the transmitted bit and the state of said communication channel, said means for disabling further including means for only decrementing said word boundry register means for each bit transmitted on said single data communication channel; and, bit competition means responsive to said word boundry register means being decremented to 0 for comparing the contents of its bit position register with the contents of the bit position registers in the other senders to enable said transmitter means when the content of its bit position register is indicative of the lexicographically smallest data word remaining to be transmitted.

14. The data communication system of claim 10 wherein said means for enabling comprises:

means for comparing the state of the data bit to be transmitted with a predetermined state to determine if the data bit to be transmitted is the same as said predetermined state; and, means responsive to the state of the data bit to be transmitted and the state of the communication channel being different from said predetermined state to enable said transmitter means to transmit said next data bit.

15. The data communication system of claim 14 wherein said two possible states are logical states zero and one, and wherein said predetermined state is a zero.

16. The data communication system of claim 13 wherein the collection of data words being transmitted by said plurality of senders is called a data bucket, and wherein said bit competition means transmits a predetermined bit pattern after the last data word in said data bucket is transmitted.

17. A data compression system having a communication channel interposed between a data source and an ultimate utilization device comprising:

at least one data compression module for transmitting on the communication channel the data received from the data source in a compressed format comprising an interleaved transmission of data bits and bit position bits, said bit position indicative of the number of data bits to be transmitted in the subsequent data bit transmission which are different from the preceding data bit transmission;

wherein said at least one data compression module comprises a plurality of sub-modules, each sub-module comprising:

a plurality of channel status registers for functioning as a receiver portion of said plurality of sub-modules and for storing a bit value of last transmission on said communication channel;

data storage means for temporarily storing data in a plurality of data registers, each data register storing a predetermined segment of the data;

a plurality of bit position registers, one associated with each data register, for storing bit position bits indicative of the number of data bits in its associated data register remaining to be transmitted;

a plurality of word boundary registers connected to the communication channel for storing a number corresponding to the smallest number of data bits in any data register in any sub-module remaining to be transmitted;

data storage means for temporarily storing the data received from the data source in a plurality of next data registers, each next data register storing a predetermined segment of the received data;

a plurality of next bit position registers, one associated with each next data register, for storing bit position bits indicative of the number of data bits in its associated next data register remaining to be transmitted;

a plurality of-FIFO buffers for storing and providing a continuous supply of data from the data source;

a plurality of data-ready registers for monitoring whether said plurality of data registers are ready to be loaded from said plurality of next-data registers;

a plurality of block transmitters for loading said plurality of next-data registers from said plurality of FIFO buffers, for calculating a next bit position and for setting said plurality of next-bit position registers;

means for repeatedly selecting data bits to be transmitted from said plurality of data registers; and, means for transmitting said selected data bits on said communication channel one at a time simultaneously so that a full block of data of a sender is transmitted in a single data bucket using a block transmission method.

* * * * *